(12) United States Patent
Della Casa et al.

(10) Patent No.: US 12,463,400 B2
(45) Date of Patent: Nov. 4, 2025

(54) DIODE LASER WITH CURRENT BLOCK

(71) Applicant: FERDINAND-BRAUN-INSTITUT GGMBH LEIBNIZ-INSTITUT FÜR HÖCHSTFREQUENZTECHNIK, Berlin (DE)

(72) Inventors: Pietro Della Casa, Berlin (DE); Mohamed Elattar, Berlin (DE); Paul Crump, Berlin (DE); Hans Wenzel, Berlin (DE)

(73) Assignee: FERDINAND-BRAUN-INSTITUT GGMBH LEIBNIZ-INSTITUT FÜR HÖCHSTFREQUENZTECHNIK, Berlin (DE)

( * ) Notice: Subject to any disclaimer, the term of this patent is extended or adjusted under 35 U.S.C. 154(b) by 521 days.

(21) Appl. No.: 18/040,490

(22) PCT Filed: Aug. 5, 2021

(86) PCT No.: PCT/EP2021/071921
§ 371 (c)(1),
(2) Date: Feb. 3, 2023

(87) PCT Pub. No.: WO2022/029254
PCT Pub. Date: Feb. 10, 2022

(65) Prior Publication Data
US 2023/0299563 A1    Sep. 21, 2023

(30) Foreign Application Priority Data
Aug. 5, 2020    (DE) .................... 10 2020 120 703.4

(51) Int. Cl.
*H01S 5/00* (2006.01)
*H01S 5/16* (2006.01)
(Continued)

(52) U.S. Cl.
CPC ............ *H01S 5/168* (2013.01); *H01S 5/2206* (2013.01); *H01S 5/2226* (2013.01); *H01S 5/2232* (2013.01)

(58) Field of Classification Search
CPC ...... H01S 5/168; H01S 5/2206; H01S 5/2226; H01S 5/2232; H01S 5/2227; H01S 5/2224
See application file for complete search history.

(56) References Cited

U.S. PATENT DOCUMENTS

| 5,144,633 A | 9/1992 | Ohnaka et al. |
| 5,987,048 A | 11/1999 | Ishikawa et al. |

FOREIGN PATENT DOCUMENTS

WO    2011/098797 A2    8/2011

OTHER PUBLICATIONS

International Search Report mailed Nov. 19, 2021, in connection with PCT International Application No. PCT/EP2021/071921.
(Continued)

*Primary Examiner* — Kinam Park
(74) *Attorney, Agent, or Firm* — Norris McLaughlin, PA

(57) ABSTRACT

The present invention relates to a diode laser with a current block and, in particular, to a diode laser with a modified "p-n-p" or "n-p-n" structure as a current block for reducing the tunneling probability. A diode laser according to the invention comprises an active layer and a layered current block formed outside the active layer, wherein the current block is made of a material doped in opposition to its surroundings for a spatially selective current injection of the active layer between an n-substrate and a p-contact; wherein the current block is separated from adjacent layers via an intrinsic outer layer.

9 Claims, 5 Drawing Sheets

(51) Int. Cl.
*H01S 5/22* (2006.01)
*H01S 5/223* (2006.01)

(56) References Cited

OTHER PUBLICATIONS

English translation of International Search Report mailed Nov. 19, 2021, in connection with PCT International Application No. PCT/EP2021/071921.
Written Opinion issued in connection with PCT International Application No. PCT/EP2021/071921.

DIODE LASER WITH CURRENT BLOCK

This application is the U.S. National Stage of International Application No. PCT/EP2021/071921, filed Aug. 5, 2021, which claims foreign priority benefit under 35 U.S.C. § 119 of German Patent Application No. 10 2020 120 703.4, filed Aug. 5, 2020, the disclosures of which are incorporated herein by reference.

DESCRIPTION

The present invention relates to a diode laser with a current block and, in particular, to a diode laser with a modified "p-n-p" or "n-p-n" structure as a current block for reducing the tunneling probability.

STATE OF THE ART

Broad-area diode lasers (BALs) can exhibit particularly high efficiency and brilliance/beam density. In the associated structures, current-blocking layers, so-called current blocks, are integrated into the edge regions of the components. These are intended to provide current confinement under the center of the stripe so that the adverse effects of current broadening and lateral carrier accumulation (LCA) on beam quality can be limited. Further, losses at the stripe edges can thus be minimized, lowering the laser threshold and increasing conversion efficiency while maintaining high polarization purity. Reducing current and carrier density at stripe edges results in lower gain for higher order lateral modes, and thus can even reduce the number of guided modes while improving beam properties.

A variety of lateral patterning techniques have been developed to realize the desired central confinement of current and charge carriers, especially in GaAs-based BALs, with the challenge of improving beam quality without compromising $\eta_E$, maximum $P_{opt}$ or the lifetime of the components. One such technique is high-energy deep ion implantation to prevent current flow in the device edges. Implantation profiles, especially those reaching the n-doped side of the BAL, i.e., passing through the active region, eliminate current broadening in the A-side and suppress LCA due to the rapid recombination of charge carriers diffusing into the device edges at the point defects introduced by the implantation (M. Winterfeldt et al., IEEE Photonics Technol. Lett. 27, 1809-12 (2015); M. M. Karow et al, CLEO/Europe-EQEC, cb-5.4 (2019)). Another way to block current flow outside the laser stripe is to target O and Si implantation in these regions (D. Martin et al., Proc. SPIE 10900, 109000M (2019); P. Della Casa et al., Semicond. Sci. Technol. 34, 105005 (2019)). Here, the current block is formed in the p-side cladding layer. These two methods can effectively improve the beam quality, but with a compromise in $\eta_E$ and low repeatability of the process.

Current-blocking structures can also be formed by integrating a highly doped n-layer into a highly doped p-side (sub)contact layer of a diode laser ("p-n-p" structure). Such structure can be advantageously used to block the current outside the laser stripe, especially in high power broad stripe diode lasers (Y. Yamagata et al., Proc. SPIE 9348, 93480F (2015); M. Elattar et al., Semicond. Sci. Technol. 35, 095011 (2020)). Similarly, the n-doped blocking layer can also be integrated into other layers of the p-side of a diode laser, e.g., into the cladding layer. The blocking layer can also be p-doped and integrated into the n-side of the laser, i.e., formed as an "n-p-n" structure. However, such current-blocking structures exhibit only low punch-through voltages due to the tunneling effect caused by the thin depletion zone formed at each p-n junction. The occurrence of tunnelling currents thereby reduces the effectiveness of blocking at high powers and temperatures.

DISCLOSURE OF THE INVENTION

It is therefore an object of the present invention to provide a diode laser with a current block in which the tunneling probability is reduced by the current block. In particular, the effectiveness of the blocking should be maintained even at high powers and temperatures.

These objects are solved according to the present invention by the features of appended claim 1. Expedient embodiments of the present invention are contained in the respective independent claims.

A diode laser according to the present invention comprises an n-substrate made of an n-doped material; an n-cladding layer made of an n-doped material disposed on the n-substrate; an n-waveguide layer made of an n-doped material disposed on the n-cladding layer; an active layer disposed on the n-waveguide layer; a p-waveguide layer made of a p-doped material disposed on the active layer; a p-cladding layer made of a p-doped material disposed on the p-waveguide layer; a p-contact layer made of a p-doped material disposed on the p-cladding layer; and a p-contact disposed on the p-contact layer; wherein the diode laser is formed by a layered current block made of a material doped in opposition to its surroundings for a spatially selective current injection of the active layer between the n-substrate and the p-contact; wherein the current block is separated from adjacent layers via an intrinsic outer layer (i.e. an outside layer of an intrinsic material), wherein the thickness of the intrinsic outer layer is between 5 nm and 50 nm. The current block can be implemented either by an n-doped layer integrated into the p-side of the laser or by a p-doped layer integrated into the n-side.

The materials of the individual layers are in particular semiconductor materials. In diode lasers, the contact layer is generally defined as a layer that is effectively designed for current conduction but does not participate in optical waveguiding. The contact layer can also be formed as a layer stack. In particular, the contact layer may comprise a subcontact layer and a contacting layer disposed thereon. Typically, a very highly p-doped thin contacting layer is selectively implanted using standard methods to define the stripes prior to metallization (P. Della Casa et al., Semicond. Sci. Technol. 32, 065009 (2017)). In contrast, a current block, which is also generally not intended to participate in optical waveguiding, has the task of effectively suppressing or blocking a current flow through the block. The current flow in the laser diode can thus be locally restricted by the arrangement of the current block.

The intrinsic outer layer can be disposed on the upper side or the lower side of the layered current block, with its effect being stronger on the lower side. Preferably, the current block has an upper intrinsic outer layer and a lower intrinsic outer layer. In an intrinsic (i.e., undoped) semiconductor material, the charge carrier concentrations in the conduction band and in the valence band depend essentially only on the temperature and on the band gap. In contrast, the conductivity of doped semiconductor materials is influenced by the specific doping of foreign atoms.

The absolute value of vertical distance $d_{res}$ from the active zone to the current block should be as small as possible, preferably less than 1.5 μm, more preferably less than 1 μm, and even more preferably less than 0.5 μm, to allow minimal current spread. Preferably, the current block is arranged within the p-side, for example in the p-contact layer (positive $d_{res}$, where a p-side structure thickness is typically about 2 µm). In this context, an arrangement within means that the current block is limited upwards and downwards by the p-contact layer. In contrast, an arrangement within the p-contact layer can also mean only one-sided limitation, i.e., upwards or downwards. However, the current block can correspondingly also be arranged within the p-cladding layer or the n-side of the laser, for example in the n-cladding layer (negative $d_{res}$).

Preferably, the current block, when arranged within the p-contact layer, is adjacent to a layer of $p^+$-GaAs upwards and downwards, respectively. This is essentially a "p-n-p" structure for the current block, which is extended, according to the present invention, by at least one intrinsic outer layer. When there are two intrinsic outer layers, the structure according to the present invention is referred to as a "p-i-n-i-p" structure. This is also true when the current block is arranged within the p-cladding layer. However, if the current block is arranged in the n-cladding layer, a corresponding "n-i-p-i-n" structure is formed by the respective reverse doping of the individual layers. Layers of other materials that can be adjacent to the current block include p-AlGaAs (p-cladding layer), n-AlGaAs (n-cladding layer), and any combination of an Al—In—Ga—As—P—Sb—N material system.

Preferably, the current block comprises a first layer of doped InGaP and a second layer of doped GaAs disposed on the first layer. In particular, the first layer can be formed of doped $In_{0.48}Ga_{0.52}P$. By combining two different barrier layers in the current block, the electronic properties of the current block can be improved. The type of doping (n or p) of the doped layers of the current block depends on the arrangement of the current block in the laser diode. On the p-side, the layers are each n-doped, while the layers on the n-side are each p-doped.

In the aforementioned embodiments of the current block with two barrier layers, the ratio of the thickness of the first layer to the thickness of the second layer is preferably between 0.2 and 1.0. Also preferably, the sum of the thicknesses of the first layer and the second layer is between 5 nm and 100 nm, more preferably between 20 nm and 100 nm, more preferably between 40 nm and 80 nm, and even more preferably about 60 nm. Preferably, the thickness $d_i$ of an intrinsic outer layer is between 5 nm and 50 nm, more preferably 15 nm and 30 nm, and even more preferably about 20 nm. At a thickness of 20 nm, the tunneling current density can be reduced by about 7 orders of magnitude at a typical operating voltage of 1.7 V.

Preferably, the doping density $N_D$ of the current block (i.e., the doped layer or layers of the current block) is greater than or equal to $\frac{1}{10}$ ($N_D \geq 0.1 \, N_A$), more preferably greater than or equal to ½ ($N_D \geq 0.5 \cdot N_A$), of the doping density $N_A$ of a layer surrounding the current block. Particularly preferably, the two doping densities approximately coincide ($N_D \approx N_A$). For example, when the current block is arranged within the p-contact layer, real doping densities $N_D$ for the two barrier layers are preferably z between $0.2 \cdot 10^{18}$ cm$^{-3}$ and $2 \cdot 10^{18}$ cm$^{-3}$, more preferably between 0.5 10 cm$^{18}$ cm$^{-3}$ and $1.5 \cdot 10^{18}$ cm$^{-3}$ and particularly preferably at about $1 \cdot 10$ cm$^{18-3}$. In the case of a comparable conventional current block with a "p-n-p" structure based on the aforementioned barrier layers, the doping densities $N_D$ must generally be significantly higher at about $2 \cdot 10^{18}$ cm$^{-3}$ for a comparable punch-through voltage.

Preferably, the unintended doping density $n_i$ of an intrinsic outer layer is less than or equal to one $\frac{1}{10}$ ($n_i \leq 0.1 \cdot N_D$), more preferably less than or equal to ½ ($n_i \leq 0.5 \cdot N_D$) of the doping density $N_D$ of the current block. Particularly preferred the unintended doping density is $n_i \leq 1 \cdot 10^{16}$ cm$^{-3}$. The unintended doping of an intrinsic outer layer can be either an n doping or a p-doping.

The integration of thin intrinsic layers at the p-n junctions of current blocks, which generate in particular a "p-i-n-i-p" or an "n-i-p-i-n" structure, leads to broader depletion regions and thus to a lower tunneling probability. It allows for less doping in the actual barrier layers of the current block, which spreads the depletion regions wider while maintaining good barrier effect. Widened depletion zones also reduce the tunneling probability and therefore increase the punch-through voltage.

Due to the lower tunneling probability, especially for a "p-i-n-i-p" or an "n-i-p-i-n" structure, the effectiveness of blocking is guaranteed even at high powers and temperatures. Therefore, a diode laser according to the present invention may preferably be a high power broad stripe diode laser.

Further preferred embodiments of the present invention result from the features mentioned in the dependent claims.

The various embodiments of the present invention mentioned in this application can be advantageously combined with each other, unless otherwise individually specified.

BRIEF DESCRIPTION OF THE DRAWINGS

The present invention is explained below in exemplary embodiments with reference to the accompanying drawing, wherein.

DETAILED DESCRIPTION OF THE DRAWINGS

Figure 1:
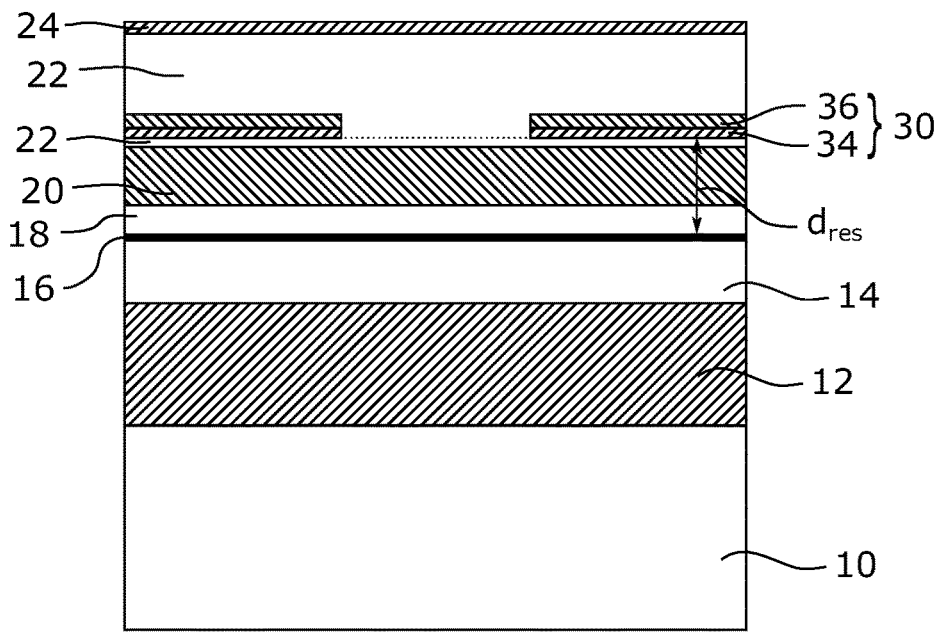
FIG. 1 shows a schematic view of an exemplary conventional laser diode with a current block having a "p-n-p" structure.

FIG. 1 shows a schematic view of an exemplary conventional laser diode with a current block 30 having a "p-n-p" structure. The shown laser diode comprises an n-substrate 10, an n-cladding layer 12 disposed on the n-substrate 10, an n-waveguide layer 14 disposed on the n-cladding layer 12, an active layer 16 disposed on the n-waveguide layer 14, a p-waveguide layer 18 disposed on the active layer 16, a p-cladding layer 20 disposed on the p-waveguide layer 18, a p-contact layer 22 disposed on the p-cladding layer 20 in the central region of the laser diode, and a metallic p-contact 24 disposed on the p-contact layer 22. The current block 30 consisting of an n-doped material is disposed within the p-contact layer 22, i.e., the current block 30 is limited upwards and downwards by the p-contact layer 22. The shown current block 30 comprises a thinner first layer 34 and a thicker second layer 36 disposed on the first layer 34. Thus, the current block 30 of the laser diode has a "p-n-p" structure.

Figure 2:
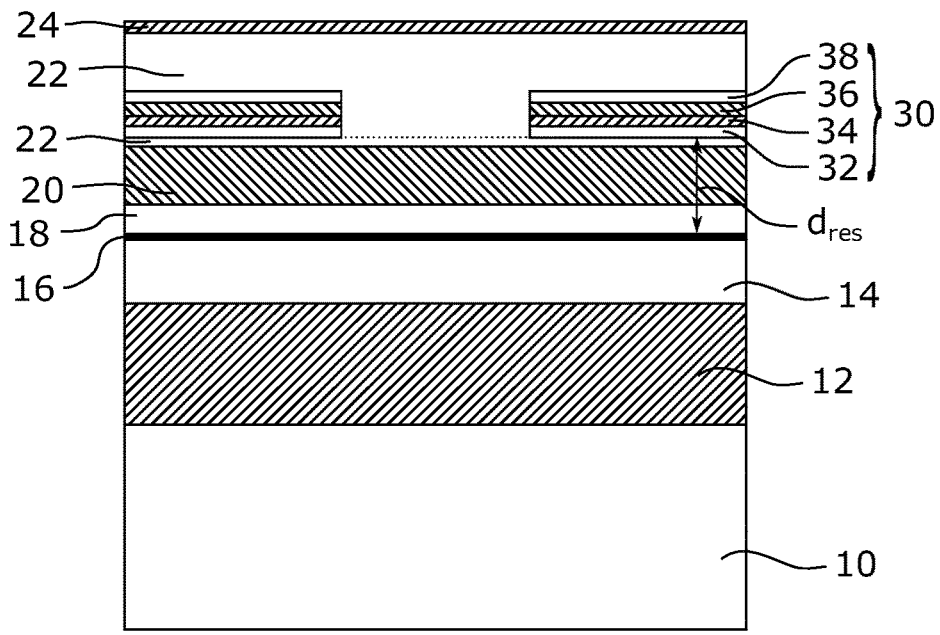
FIG. 2 shows a schematic view of a first embodiment of a laser diode according to the present invention with a current block having a "p-i-n-i-p" structure.

FIG. 2 shows a schematic view of a first embodiment of a laser diode according to the present invention with a current block 30 having a "p-i-n-i-p" structure. The basic layer structure of the laser diode corresponds largely to the view shown in FIG. 1. The respective reference numerals and their assignment to the individual features therefore apply accordingly. In contrast to the laser diode shown in FIG. 1, the current block 30 is limited at the lower side by a first intrinsic outer layer 32 and at the upper side by a second intrinsic outer layer 38. The current block 30 of the laser diode thus has a "p-i-n-i-p" structure according to the present invention. The vertical distance $d_{res}$ between the active layer 16 and the current block 30 is thereby greater than the distance between the active layer 16 and the lower side of the p-contact layer 22, but smaller than the distance between the active layer 16 and the lower side of the p-contact 24. The current block is thus arranged completely within the p-contact layer 22.

Figure 3:
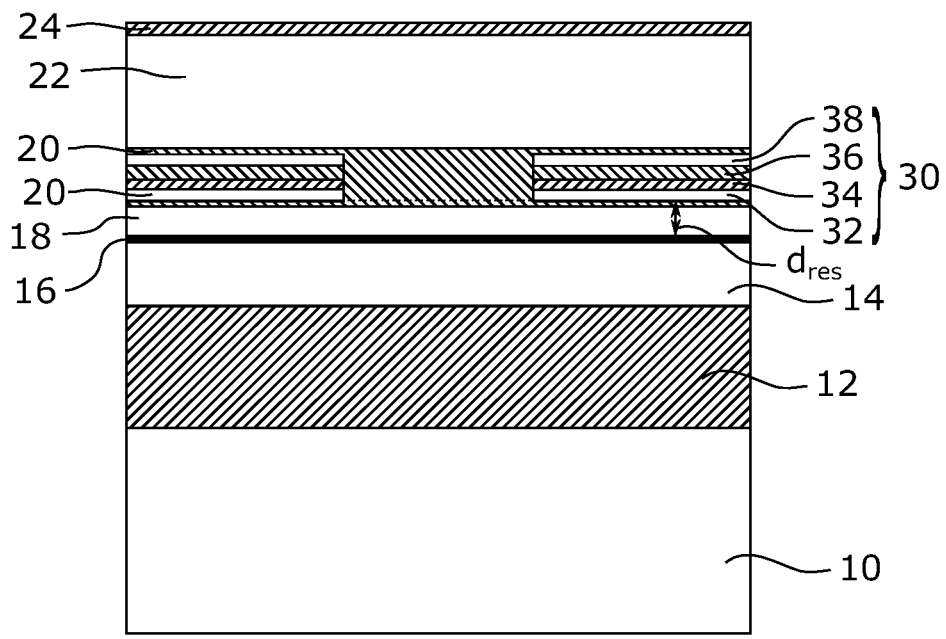
FIG. 3 shows a schematic view of a second embodiment of a laser diode according to the present invention with a current block having a "p-i-n-i-p" structure.

FIG. 3 shows a schematic view of a second embodiment of a laser diode according to the present invention with a current block 30 having a "p-i-n-i-p" structure. The basic layer structure of the laser diode corresponds largely to the view shown in FIG. 2. The respective reference numerals and their assignment to the individual features therefore apply accordingly. In contrast to the laser diode shown in FIG. 2, the current block 30 is here arranged completely within the p-cladding layer 20 instead of in the p-contact layer 22. The vertical distance $d_{res}$ between the active layer 16 and the current block 30 is therefore greater than the distance between the active layer 16 and the lower side of the p-cladding layer 20, but smaller than the distance between the active layer 16 and the lower side of the p-contact layer 22.

Figure 4:
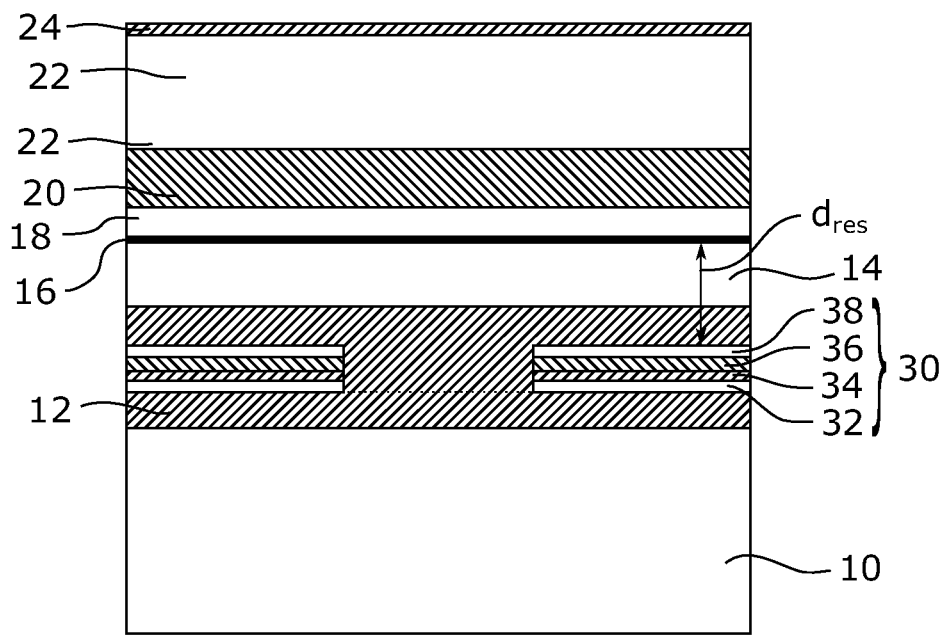
FIG. 4 shows a schematic view of a third embodiment of a laser diode according to the present invention with a current block having an "n-i-p-i-n" structure.

FIG. 4 shows a schematic view of a third embodiment of a laser diode according to the present invention with a current block having a "n-i-p-i-n" structure. The basic layer structure of the laser diode corresponds largely to the view shown in FIG. 2. The respective reference numerals and their assignment to the individual features therefore apply accordingly. In contrast to the laser diode shown in FIG. 2, the current block 30 is here arranged completely within the n-cladding layer 12 instead of in the contact layer 22. However, in accordance with the opposite doping of the n-cladding layer 12, the current block 30 must here be constructed of a p-doped material. The shown current block 30 comprises a thinner first layer 34 and a thicker second layer 36 disposed on the first layer 34. According to the present invention, the current block 30 is limited at the lower side by a first intrinsic outer layer 32 and at the upper side by a second intrinsic outer layer 38. The current block 30 of the laser diode thus has an "n-i-p-i-n" structure according to the present invention. The absolute value of vertical distance dyes between the active layer 16 and the current block 30 is therefore greater than the distance between the active layer 16 and the upper side of the n-cladding layer 14, but smaller than the distance between the active layer 16 and the upper side of the n-substrate 10.

Figure 5:
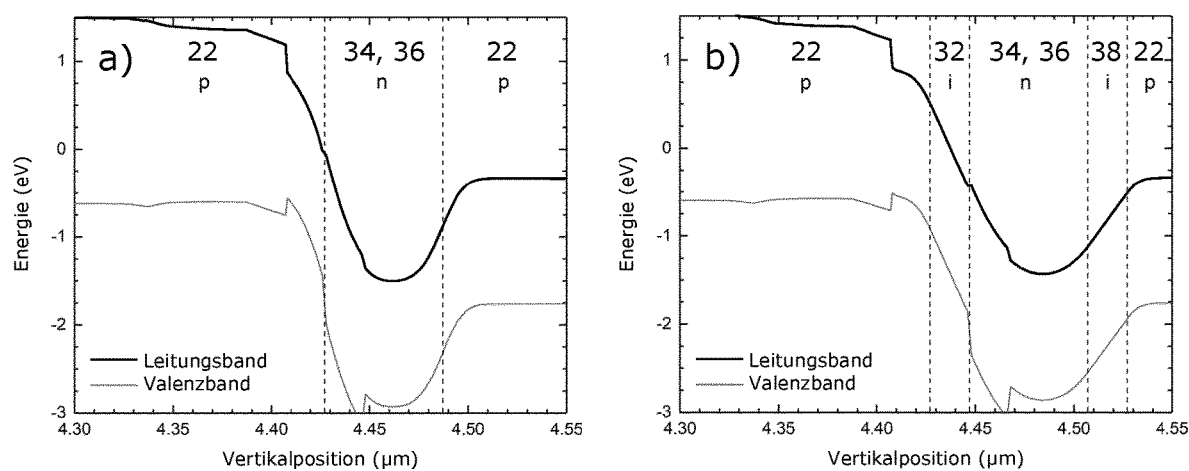
FIG. 5 shows a calculated band profile within a) a current block in a conventional laser diode according to FIG. 1 and b) an embodiment of a laser diode according to the present invention with a current block having a "p-i-n-i-p" structure according to FIG. 2.

FIG. 5 shows a calculated band profile within a) a current block 30 in a conventional laser diode according to FIG. 1 and b) an embodiment of a laser diode according to the present invention with a current block 30 having a "p-i-n-i-p" structure according to FIG. 2. In the band profile shown in a), the "p-n-p" structure is drawn with a layer sequence corresponding to a p-contact layer 22, a current block 30 with a first layer 34 and a second layer 36, and a p-contact layer 22. In the band profile shown in b), a first intrinsic outer layer 32 and a second intrinsic outer layer 38 are additionally arranged between the individual p-n junctions in accordance with the present invention. It can be seen from the shown band profiles that the "p-i-n-i-p" structure can be used to significantly increase the effective width of the current block 30, although the general profile of the band structure is largely retained.

Figure 6:
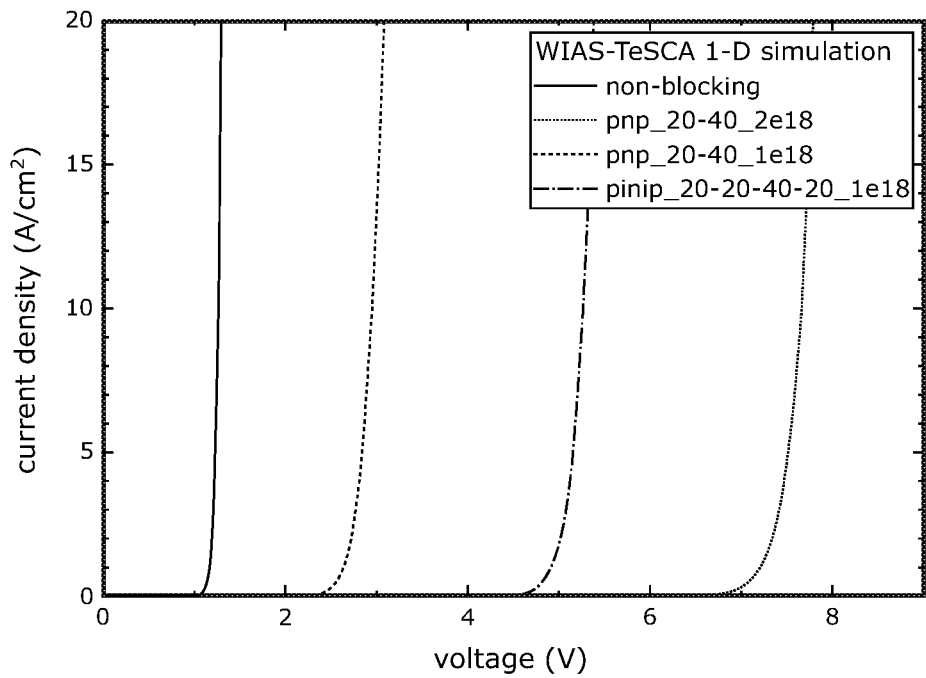
FIG. 6 shows simulations of the U-I characteristics of conventional laser diodes with and without a current block and of a laser diode according to the present invention.

FIG. 6 shows simulations of the U-I-characteristics of conventional laser diodes with and without current block and of a laser diode according to the present invention. For the simulations (WIAS-TeSCA 1-D simulation), a laser diode with a current block having a "p-n-p" structure according to FIG. 1 was assumed as the basis. The material of the contact layer was $p^+$-GaAs. The first layer of the current block made of n $In_{0.48}Ga_{0.52}P$ had a thickness of 20 nm in the simulation, while the second layer of the current block made of n-GaAs had a thickness of 40 nm. For both blocking layers, uniform doping densities $N_D$ of $1·10^{18}$ cm$^{-3}$ and $2·10^{18}$ cm$^{-3}$ were specified, respectively. In the simulation, the conventional laser diode without current block (curve "non-blocking") corresponded to the diode lasers simulated with the conventional current block except for the missing "p-n-p" structure. For a diode laser according to the present invention, the "p-n-p" structure described above was modified in such a way that the current block had a "p-i-n-i-p" structure, with the thickness of the intrinsic layers being 20 nm each. A uniform doping density $N_D$ of $1·10^{18}$ cm$^{-3}$ was specified for the corresponding blocking layers. The simulations did not consider the occurrence of tunneling effects.

For a "p-n-p" structure, the simulations predict a reduction of the punch-through voltage from about 7.2 V to about 2.7 V when the doping density $N_D$ of the n-doped blocking layers is reduced from $2·10^{18}$ cm$^{-3}$ to $1·10^{18}$ cm$^{-3}$ (curves "pnp_20-40_1e18" and "pnp_20-40_2e18"). The blocking capability of the "p-i-n-i-p" structure ($N_D=1·10^{18}$ cm$^{-3}$, curve "pinip_20-20-40-20_1e18") is expected to be between these two values according to the simulations with a punch-through voltage of about 5.0 V.

Figure 7:
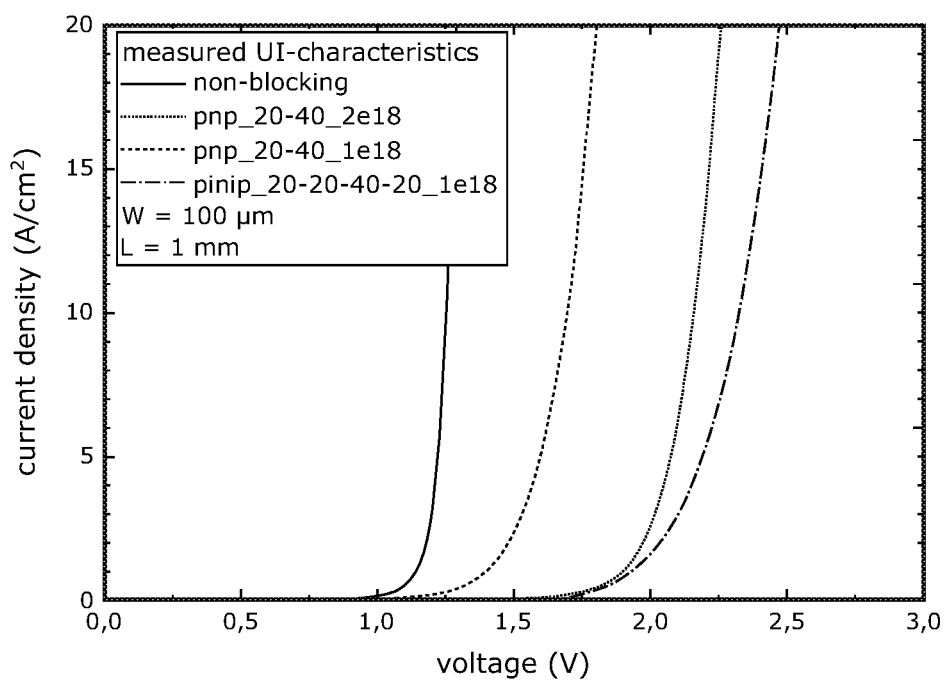
FIG. 7 shows measured U-I characteristics of conventional laser diodes with and without a current block and of a laser diode according to the present invention.

FIG. 7 shows measured U-I characteristics of conventional laser diodes with and without current block and of a laser diode according to the present invention. In particular, these are measurements of a laser diode test structure with completely uniform current block (little current should flow), a conventional laser diode without current block (reference values) and of a laser diode test structure according to the present invention. The measured laser diodes and laser diode test structures correspond to the parameters for the simulations described above for FIG. 6, therefore the assignment to the individual curves is made accordingly. The stripe width of the laser diodes was 100 µm in each case with an effective resonator length of 1 mm.

For all structures, the measured punch-through voltage is considerably lower than expected from the TeSCA simulations (FIG. 6). This is due to the fact that TeSCA simulates an ideal structure, not taking into account deviations from the ideal behavior (e. g. diffusion of In atoms or Si dopant atoms) or various electrical effects (e.g. tunneling, avalanche formation, . . . ). However, compared to other structures, a "p-i-n-i-p" structure according to the present invention offers a clear advantage. The simulations predict that the punch-through voltage should be between the "p-n-p" structures with high and low doping density $N_D$, while the measurements show that it actually has the highest blocking capability despite the low doping density of the n-doped blocking layers. In particular, this is due to a significant reduction in tunneling currents and thus tunneling probability.

Figure 8:
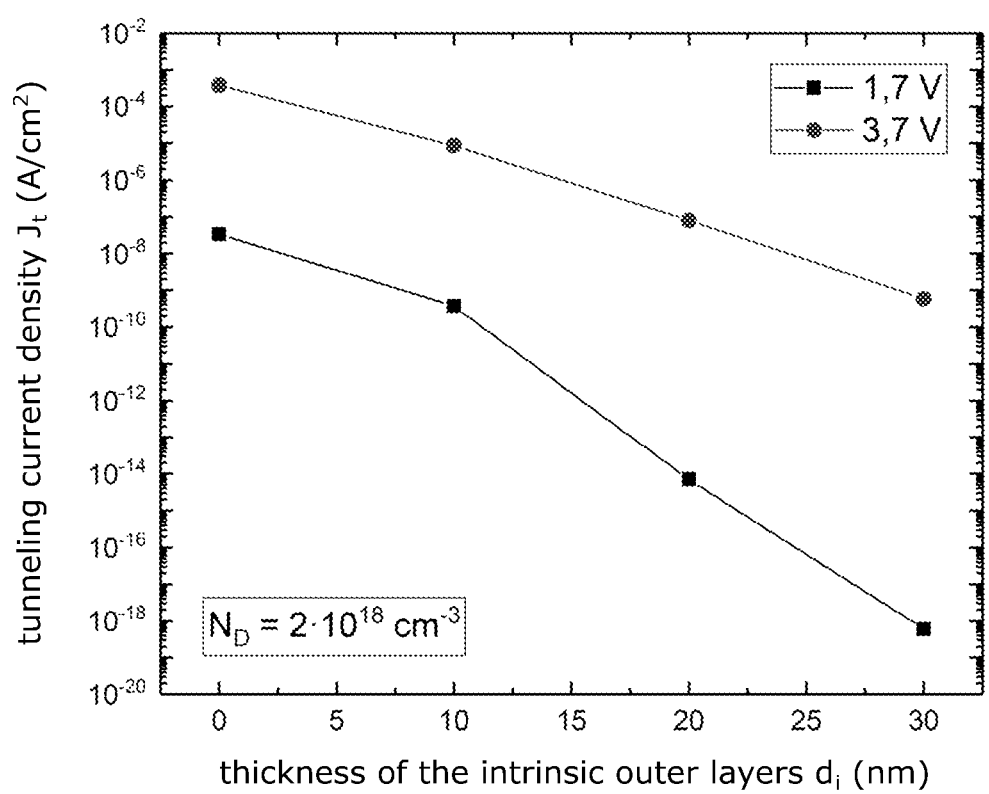
FIG. 8 shows a calculation of the tunnelling current density $J_t$ for different thicknesses $d_i$ of the intrinsic outer layers and different voltages U.

FIG. 8 shows a calculation of the tunnelling current density $J_t$ for different thicknesses $d_i$ of the intrinsic outer layers and different voltages U. The calculation is based on simulated band profiles and on the calculation model from Y. Taur and T. H. Ning, Fundamentals of Modern VLSI Devices, 2nd ed. Cambridge University Press (2009). At a typical operating voltage of 1.7 V, the tunneling current density $J_t$ is reduced by 1 order of magnitude for a thickness $d_i$ of the intrinsic outer layers of 5 nm. For a preferred thickness of 10 nm, the tunneling current density $J_t$ is reduced by 2 orders of magnitude, for a most preferred thickness of 20 nm by 7 orders of magnitude, and for a likewise preferred thickness of 30 nm by 11 orders of magnitude. The calculation also shows that increasing the voltage (e.g., to 3.7 V) leads to an increase in the tunneling current density $J_t$.

LIST OF REFERENCE NUMERALS 10 n-substrate
12 n-cladding layer
14 n-waveguide layer
16 active layer
18 p-waveguide layer
20 p-cladding layer
22 p-contact layer
24 p-contact
30 current block
32 first intrinsic outer layer (current block)
34 first layer (current block)
36 second layer (current block)
38 second intrinsic outer layer (current block)

The invention claimed is:

1. Diode laser, comprising:
an n-substrate made of an n-doped material;
an n-cladding layer made of an n-doped material disposed on the n-substrate;
an n-waveguide layer made of an n-doped material disposed on the n-cladding layer;
an active layer disposed on the n-waveguide layer;
a p-waveguide layer made of a p-doped material disposed on the active layer;
a p-cladding layer made of a p-doped material disposed on the p-waveguide layer;
a p-contact layer made of a p-doped material disposed on the p-cladding layer; and
a p-contact disposed on the p-contact layer;
wherein the diode laser comprises a layered current block made of a material doped in opposition to its surroundings for a spatially selective current injection of the active layer between the n-substrate and the p-contact;
wherein the current block is separated from adjacent layers via an intrinsic outer layer, wherein the thickness of the intrinsic outer layer is between 5 nm and 50 nm, wherein the current block comprises a first layer having a first thickness and a second layer disposed on the first layer having a second thickness greater than the first thickness, and wherein the sum of the thicknesses of the first layer and the second layer is between 5 nm and 100 nm.

2. Diode laser of claim 1, wherein the current block comprises an upper intrinsic outer layer.

3. Diode laser of claim 1, wherein the current block is disposed within the p-contact layer, within the p-cladding layer, or within the n-cladding layer.

4. Diode laser of claim 1, wherein an absolute value of the vertical distance $d_{res}$ of the current block from the active layer is less than 1.5 μm.

5. Diode laser of claim 1, wherein the first layer is made of doped InGaP and the second layer is made of doped GaAs.

6. Diode laser of claim 5, wherein the first layer is formed of doped $In_{0.48}Ga_{0.52}P$.

7. Diode laser of claim 1, wherein the ratio of the thickness of the first layer to the thickness of the second layer is between 0.2 and 1.0.

8. Diode laser of claim 1, wherein the doping density $N_D$ of the current block is greater than or equal to 1/10 of the doping density $N_A$ of a layer surrounding the current block.

9. Diode laser of claim 1, wherein the current block comprises a lower intrinsic outer layer.

* * * * *